Feb. 16, 1971　　A. J. NELSON　　3,563,043
OCEANIC STATION

Filed April 23, 1969　　3 Sheets-Sheet 1

INVENTOR.
ARTHUR J. NELSON.

United States Patent Office 3,563,043
Patented Feb. 16, 1971

3,563,043
OCEANIC STATION
Arthur J. Nelson, 1998 Broadway,
San Francisco, Calif. 94109
Filed Apr. 23, 1969, Ser. No. 818,621
Int. Cl. B63b 21/50, 35/44
U.S. Cl. 61—46.5
12 Claims

ABSTRACT OF THE DISCLOSURE

A vertical array disposed to selectively adjustable situations in a body of liquid supported by immersed buoyant chambers of capacity in excess of the array weight, said excess opposed by cables uniformly tensioned by anchoring means to the floor of the liquid. Monitoring and control means compensate for natural or deliberately applied forces to the array to maintain stability and protective measures sustain reliability as a vertical assembly. Means are provided to cope with extending the cable to the floor at great depth. The cables are utilized solely as vertical load transmitting members with reliance on hydraulic means to oppose horizontal forces tending to displace the established vertical alignment of the array.

BACKGROUND OF THE INVENTION

The present invention relates to the art of providing a stable ocean station and, more particularly, is directed to application in very deep water.

In the prior art, various arrangements have been adapted with chief reliance on flotation of a vessel or support from rigid columns bearing on the ocean floor. The disadvantages of the former principle are that a floating body is subject to inherent characteristics of heaving, pitch, roll, and drift especially requiring corrective devices such as continuously traversing a circuitous route with electronic systems employed for navigational aids, so that such floating bodies are not steady nor have a finite position advantageous to the application. The "column" principle is applicable to shallow waters, so that with increases in depth those columnar arrangement are prohibitively costly, intricate, and cumbersome and their record of desirability is greatly diminished by their destruction in storms and in transport from site to site.

It is an object of the present invention to provide an oceanic station that remains at a finite point and is as motion-free as possible when not on terra firma.

Another and more specific object of the invention is to provide for the elevation adjustment of a utility area relative to the surface of water. This pertains to either selective elevation above surface as normal operable position with temporary or prolonged immersion of the entire station as a specific application.

Yet another object of the invention is to provide automatic stabilization of the station with change in loading either by deliberate act or natural causes.

Still another object of the invention is the monitoring of the volumetric content of pontoons to correspond with changes in load imposed so that tension in the guy system remains unchanged from established values conforming with its stabilizing function.

Another object of the invention is monitoring and controlling support capacity of a compartmentized pontoon system consistent with load distribution.

A further object of the invention is the wide deployment of a compartmentized pontoon system and their systematic restraint in a level array.

The foregoing and other objects of the invention will become more apparent when viewed in light of the following description and accompanying drawings.

SUMMARY OF THE INVENTION

The present invention may be summarized as an apparatus to stabilize an oceanic station by an anchored guy system, restraining to an immersed condition the volumetrically controlled buoyant chambers of the station. The distinction from a floating vessel type of support further includes compartmentizing of the chambers for selective control consistent with distribution of loads imposed on the station to maintain plumb. The division of the guy system in equal segments by interspersed cable weight supporting buoys enables the use of the station at great ocean depths and their stress protection yields a more economical use of members. The station is a vertical array of objects readily retractable for movement from site and adjustably arranged at destination.

REFERENCES

Ref. A—Applicant's copending application 789,494, filed Jan. 7, 1969; Ref. B—Pat. No. 3,359,741, issued Dec. 26, 1967; Ref. C—Pat. No. 3,432,704, issued Mar. 11, 1969.

ARRANGEMENT

Figures 1, 2, 3, 4, 5:
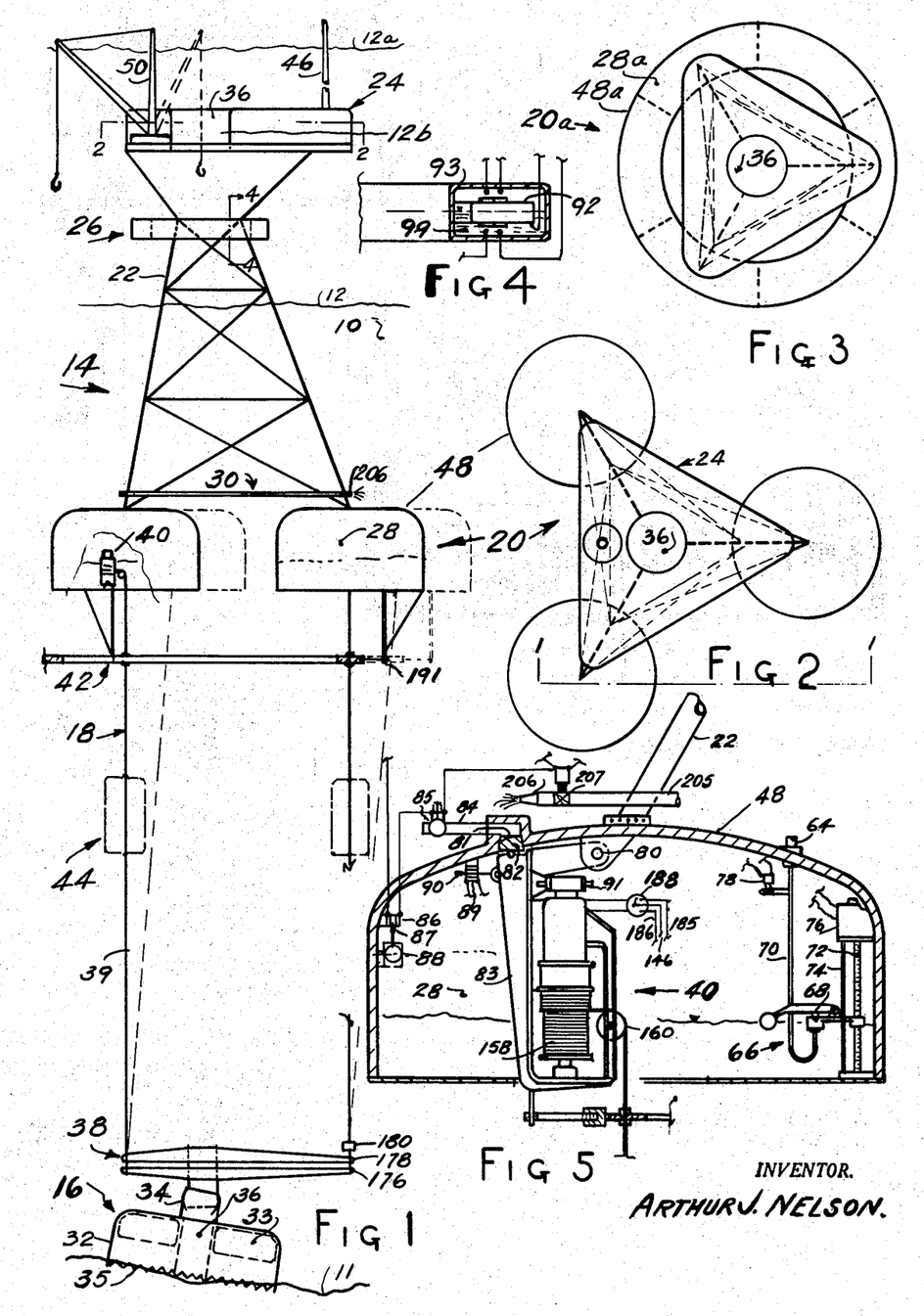
FIG. 1 is an elevation view diagrammatically illustrating the entire station of the invention in the condition it would assume fixed at a site, with parts thereof broken for purposes of compactness. View taken in direction of line 1—1 of FIG. 2.
FIG. 2 is a plan view from above typifying a preferred configuration of the pontoon arrangement and corresponding structure. View taken in direction of line 2—2 of FIG. 1.
FIG. 3 is an alternate configuration to that of FIG. 2.
FIG. 4 is a partial elevation view in section of the leveling device monitoring support capacity of the pontoon system. View taken in direction of line 4—4 of FIG. 1.
FIG. 5 is a sectional elevation view of an individual pontoon, with parts connected to it broken away.

FIG. 1 shows a body of water 10 having a floor 11 and selective surfaces 12, 12a, 12b with an exemplary embodiment of the oceanic station comprising the three essential components, namely: a buoyant structure 14, an anchorage 16, and a guy wire system 18 restraining structure 14 to a finite position. Buoyant structure 14 is sectionally considered comprising: a pontoon system 20, with tower 22 extending thereabove to support, a vessel 24 representing a utility area containing appurtenances significant with the purpose of the oceanic station and apparatus pertinent to its operation.

The plumb of structure 14 is monitored by leveling device 26 in communication with specific controls regulating volumetric change to compartmentized gaseous chambers 28 of the pontoon system 20. Stabilizer system 30 as developed in Reference A maintains orientation and alignment of structure 14 with anchorage 16 as monitored by control means 42.

Anchorage 16 is shown to rest in conformance with the contour of floor 11 and comprises a massive housing 32 with centrally located universal coupling 34 to which the guy system 18 is connected. Housing 32 encloses a gaseous chamber 33 of adjustable volume to buoyantly control the weight of anchorage 16 bearing on floor 11 and negate the weight when suspended by guy system 18. Housing 32 is fitted with protrudences 35 to resist anchorage slip along floor 11. A well 36 through housing 32 and coupling 34 and vessel 24 to permit clear passage of objects throughout the vertical array of members.

Guy system 18 comprises a tension equalizing system 38 as developed in Reference B, at least one cable segment 39, a motorized reel mechanism 40 to adjust the length and limit the tension in cables 39. Cable pontoons 44 are interposed in guy system 18 when required to provide equal divisions for a multi-segment 39 each segment suspended weight sustained by a buoy 44. Thus the load transfer capacity of the cable segment 39 anchoring structure 14 is increased since the detrimental cable weight factor is proportionably diminished by this division.

The pontoon system 20 is restrained to a completely immersed position by anchorage 16 through guy system 18, resisting excessive buoyant support capacity deliberately exerted over the total dead weight of structure 14. The excess buoyancy is provided in a minor way in opposition to slight added loads whereas leveling device 26 automatically monitors load changes of any consequence to control volumetric displacement of individual chambers to respond with appropriate buoyant support.

The elevation of structure 15 with respect to water surface is adjusted by reels 40 dependent upon purpose and conditions. Ordinarily, surface 12 intercepts tower 22 of skeleton nature providing no capacity to vary the buoyant support established, and offers minimum resistance to "surface" effects. With surface 12a above structure 14, the watertight vessel 24 contributes to buoyant support in constant amount since no variance of buoyancy is included with vessel 24, correspondingly diminish support requirements of pontoon system 20. This diminish of support by pontoon system is automatically arranged as will become more apparent subsequently. Vent 46 is provided to retain atmospheric and operable conditions when vessel 24 is submerged. With surface 12b indicating a water line for floating vessel 24, the anchorage 16 is retracted in light weight condition for propulsion of the station to new destination. Again the pontoon system 20 support capacity is diminished by the equivalent of the displacement of vessel 24.

FIG. 2 shows an arrangement of the pontoon system 20 with three spaced pontoons 48 joined by tower 22. FIG. 3 shows an alternate pontoon arrangement, correspondingly designated 20a, depicted as a toroidal pontoon 48a with compartments 28a. Vessel 24 appears triangular shaped only by choice and central well 36 is representative of any one or more passages however oriented. Likewise crane 50 is symbolic of pertinent apparatus.

FIG. 1, as specified, shows one pontoon 48 concealed by its duplicate and spaced half the distance of the third like pontoon to the centroid of the arrangement. Similarly the 3 guy lines of the cable segment 39 are considered in view of th eequalizer system 38 developing equal restraint to the three pontoons 48.

PARTICULARS OF MEMBERS AND APPLICATION

Buoyancy support system

The system in this application is an expansion of the principle embodied in Reference B, utilizing a common conduit extending between stations and progressively establishing buoyancy chambers compatible with its environment. This expansion relates to the treatment of a cluster of chambers at each elevation and regulation of support capacity of selected chambers.

"Short setting" (without cable pontoons)

As a simplified method the valve mechanism 66, as can be seen from FIG. 5, is designed to maintain a predetermined volume 28 of gas within the pontoon 48 and to provide means to selectively vary this volume. It comprises: a float valve 68, a flexible conduit 70 connecting the conduit 64 to the valve 68, a screw and a guide 72 and 74, respectively, supporting the float valve 68 for select vertical movement in the gas chamber 28 of the station 48; and, an electric motor 76 coupled to the upper end of the screw 72 to effect its selective turning and resultant vertical movement of the valve 68. The valve 68 functions to admit gas into the chamber 28 of the station 48 whenever the water level within the chamber rises above the level of the valve. Through raising and lowering of the valve 68 by activation of the motor 76, the water level within the chamber may be selectively varied. The function of valve 78 is to exhaust gas from the chamber as will be disclosed in a subsequent discussion of reel mechanism 40. While not illustrated, it should be understood that the electrical control lines for the motor 76 would lead to suitable manual and/or condition responsive control means.

The motor 76, as well as the other submerged motors in the present system, would preferably be of the type disclosed in Reference C.

Figures 6, 7, 8, 9, 10, 11:
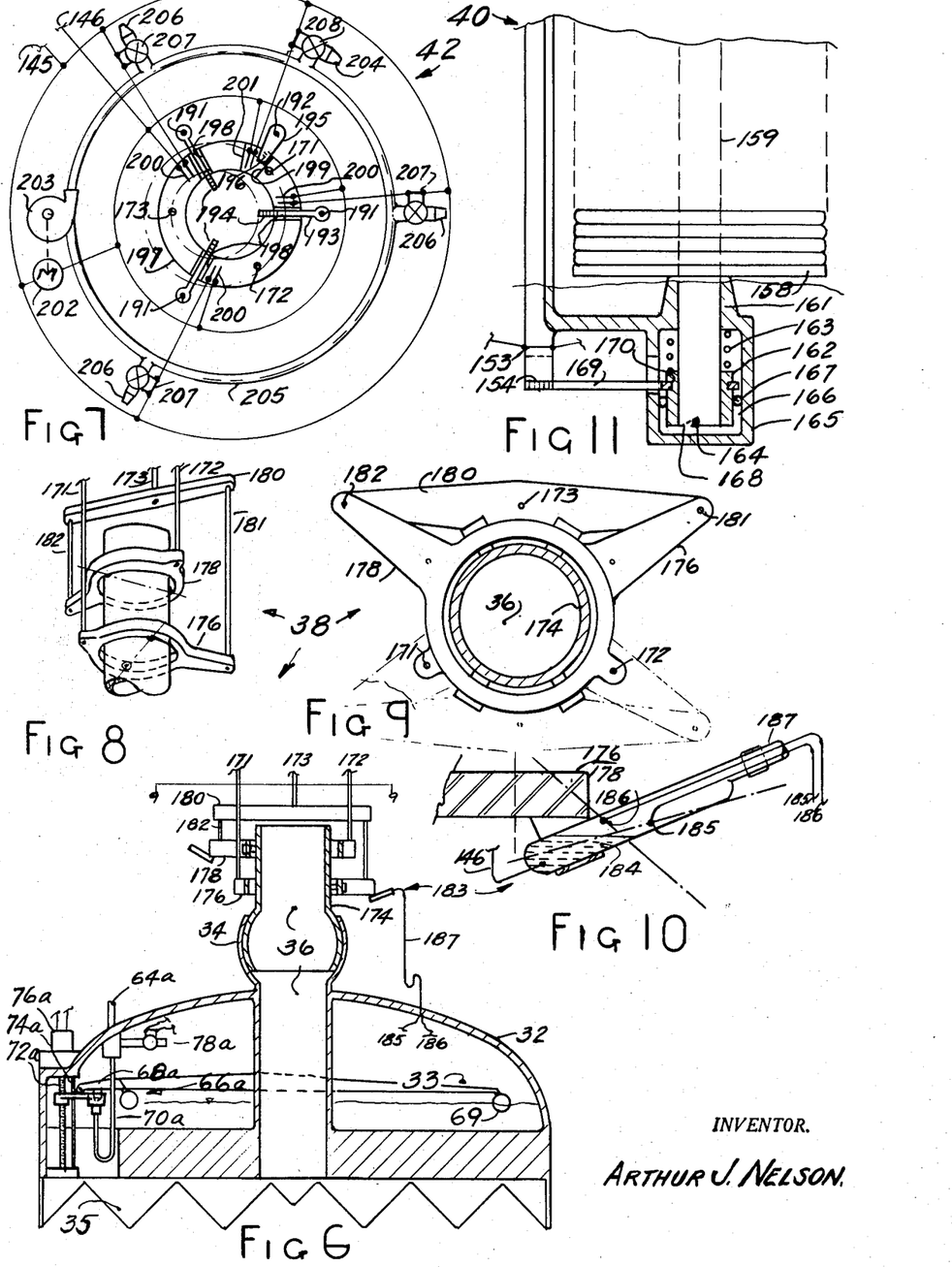
FIG. 6 is a sectional elevation view of the anchoring structure at rest on the ocean floor with connection to the pontoons broken away.
FIG. 7 is a plan view diagrammatically and schematically illustrating the vertical and rotational alignment structure of the invention designated as the stabilizing system.
FIG. 8 is a perspective view with part broken away of the equalizer employed for the guy line cable connection of the buoyant structure to the anchor.
FIG. 9 is a sectional view taken on the plane designated by line 9—9 of FIG. 6, illustrating the elements of the tension equalizer of FIG. 8.
FIG. 10 is a sectional diagram of a mercoid type switch to monitor inequalities in guy line lengths.
FIG. 11 is a partial elevation view with the portion sectioned indicating the reel mechanism associated with guy line tension limit device.

From FIG. 6 the chamber 33 of the anchorage 16 is provided with valve mechanism 66a corresponding substantially to the mechanism 66 of the station 48. For the sake of concise reference, the elements of the mechanism 66a corresponding to those of the mechanism 66 are designated by like numerals followed by the subscript a, as follows: float valve 68a; flexible conduit 70a; screw 72a; guide 74a; motor 76a; and, valve 78a. The flexible conduit 70a is connected to a supply conduit 64a, corresponding substantially to the conduit 64. Valve mechanism 66a is fitted with a multiple number of floats 69 equally spaced with most remote one positioned on an extension of the radial line to and from valve 68a and connected so any one can actuate mechanism 66a corresponding with rise or position of the liquid level in chamber 33.

"Deep Setting" (with one or more clusters of cable buoys 40)

Figure 12:
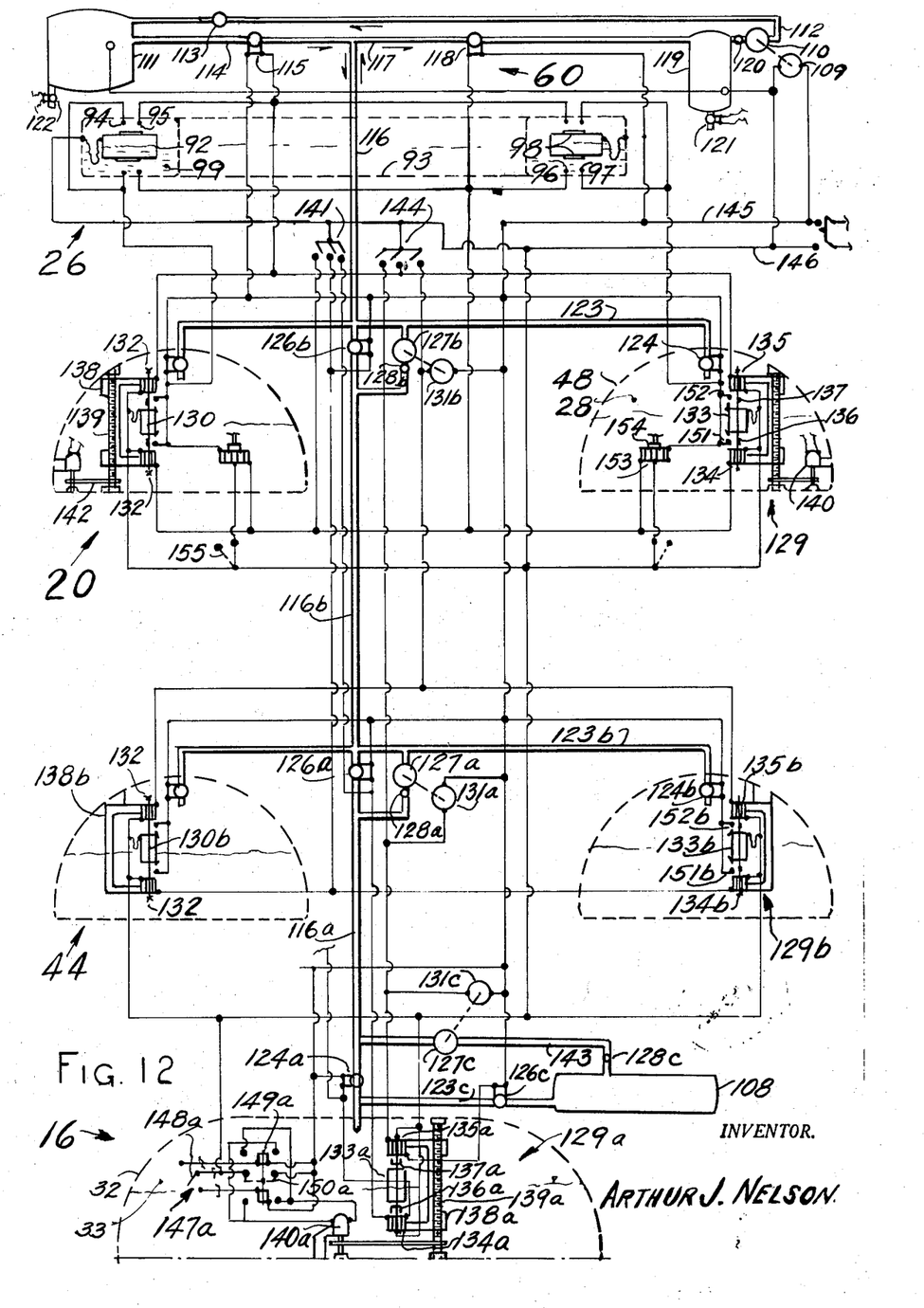
FIG. 12 is an elevational schematic view illustrating the buoyancy circuitry employed with the arrangement of FIG. 1.

FIG. 12 is an adaption of Reference B with the distinction that in the present application reliance is upon an anchorage to establish stability without a "floating" means. Reference B, however, was dependent basically upon a vessel floating on the water surface and was without an anchor means. The present application also distinguishes in the means to independently control one or more of a cluster or of clusters of members. Appraisal of the overall arrangement of FIG. 12 concerns: pneumatic apparatus 60 and leveling device 26 both understood to be located on tower 22 or vessel 24, pontoon system 20, cable buoys 44 understood to be in as many repeating clusters as required to the equalizer and anchorage 16: (Insofar as assemblies and members function similarly, like numerals are applied to each with subscript a applied to anchorage assemblies and b to cable buoy assemblies. Repetition of identifying numerals is omitted to like members of assemblies already declared identical.)

Pneumatic system and control

The main source of gas in the embodiment diagrammatically illustrated in FIG. 12 comprises a motor 109 driving a compressor 110 having the discharge thereof coupled in fluid communication with pressure tank 111 by a conduit 112 and check valve 113 limiting directional flow to tank 111. Conduit 114 including a valve 115 is in fluid communication with and flow from tank 11 to conduit 116. Conduit 117 with valve 118 is in fluid communication with and flow from conduit 116 to storage tank 119. Check valve 120 provides fluid communication directly from tank 119 to compressor 110. Valve 121 provides for renewal of air supply or vent of air dependent upon tank 119 capacity. Valve 122 provides excess pressure relief for tank 111. Control of motor 109 is by conventional means responding to tank indicators. Valves 115 and 118 are normally spring closed and not simultaneously operable, permitting either flow to or from conduit 116 respectively when electrically activated.

Pontoon system 20 comprises a duplication of apparatus for each pontoon housing 48 of the cluster of pontoons. Branch conduits 123 with valve 124 provides fluid communication and flow control between conduit 116 and individual gaseous chambers 28 defined within housing 48. Ends of conduit 116 and 116b are contiguous connected to valve 126b and inlet of compressor 127b is connected to conduit 116 and discharge connected with check valve 128b for fluid flow directly to conduit 116b. Compressor 127b increases fluid pressure in conduit 116b over that in conduit 116 with valve 126b closed to prevent recirculation. Valves 115, 118, 121, 122, 124, 126 are spring loaded closed and electrically operable to open.

Continuity of fluid flow from conduit 116b to conduit 116a is a repetition of above for each succeeding cable buoy cluster 44. Termination of the pneumatic conduit system may be with end of conduit 116a communicating with gas chamber 33 of anchorage 16. Such simple termination is consistent with the step up principle of stage increase of fluid pressure. However, in consideration of differences in volume of gaseous chambers and volumetric changes required in particular regard to chamber 33 of anchorage 16, an additional compression stage situated adjacent to anchorage 16 is introduced to provide a storage of higher pressure gas than exists in chamber 33. Compressor 127c of low capacity high pressure characteristic is in fluid communication with conduit 116a and tank 108 by way of conduit 143 including check valve 128c controlling flow to tank 108. Conduit 123c provides fluid communication between tank 108 and chamber 33 with valve 126c regulating flow through conduit 123c and valve 124a avoiding recirculation of gas through compressor 127c. Tank 108 is the store of gas for chamber 33 with excess flow rate over the capacity of compressor 128a. Thus chamber 33 of large and variable volume is attended by small compressors. Tank 108 is charged over a prolonged period.

The charging and discharging of gas from each of the gaseous chambers is effected through means of buoyancy monitoring structure for each and control means operated responsive to the conditions sensed. Like numerals will again be applied to corresponding elements applying subscript $a$ and $b$ as before. Referring to FIG. 12 the structure 129 of pontoon 48 comprises: a rod 130 received for free axial movement between a pair of bearings 132, a float 133 fixed to rod 130 between bearings 132, a pair of magnetically operated switches 134, 135 received loosely around rod 130 in vertically spaced relationship, a pair of switch actuating blades 136, 137 fixed to rod 130, one between float 133 and switches 134, 135. A frame 138 for mounting switches 134, 135 is vertically adjustable by power operated screw 139 driven by motor 140 through power transmission means 142. Structure 129 also includes two contacts 151, 152 spaced on both sides of float 133 and arranged to be activated simultaneously with switches 134, 135 upon engagement with mating contacts fixed to float 133. Structure 129b is similarly fitted with switches 151b, 152b. Structure 129a instead includes a pair of double magnetic switches 134a, 135a and pair of double vanes 136a, 137a activated by corresponding position of float 133a. Double switches 134a, 135a serve the same function as the simultaneously operated combination of switches 134, 151, 134b–151b, 135–152, 135b–152b. Any interchange is simply preference. The structure 129a for anchorage 16 is like that of 129 for pontoon system 20 except as shown in FIG. 1 is a single chamber arrangement. This choice does not void use of an anchorage configuration of FIG. 2 or FIG. 3 representing multiple chambers which then would employ the branch continuance of pontoon system 20.

The structure 129b for cable buoys 44 is like that for structure 129 of the pontoon system 20 except FIG. 12 arbitrarily shows frame 138b fixed in position, through it too may have been made vertically adjustable. The adjustability of frames 138 and 138a provides for variation in buoyant support capacity, a definite requirement of pontoon system 20 and anchorage 16. However, the loading of cable buoys 44 is constant; so the calibrated load capacity of buoys 44 establishes position of frame 138b. Pontoons 48 are preferably rigidly connected as per fastening 27 to legs 23 of two 22 and floats 33 of structure 129 are positioned on the maximum extension of the radial line established from the centroid of structure 14 through the point defining the connection with the pontoon. Similarly for pontoon 20a with additional chambers monitored by floats straddling those previously established.

Electric system line diagram

The volumetric control means for each gaseous chamber is electrically operated by means of a pair of leads 145, 146 extending from an electrical supply on vessel 24 to anchorage 16. Trace of lead 145 is directly to a "leg" of all electrically powered apparatus and lead 146 with switches in series to the other "leg." Activated switches complete a circuit. Directional rotation control circuit 147a for motor 140a with remote switch 148a located in vessel 24, selectively positions structure 129a. Circuit 147a comprises a pair of solenoids 149a to activate a double throw switch 150a; so that engagement from one position to the other alternates rotation of the motor 140a. When screw 139a positions frame 138a in uppermost position to obtain least gaseous volume with corresponding rise of water level in housing 32, a maximum anchorage weight is imposed on the floor. Oppositely, in lowermost position a maximum gaseous volume exists with buoyant capacity in excess of anchorage weight, a margin effecting a force to free anchorage from impaction in floor 11. Intermediate positions yield control of weight commensurate with conditions, e.g. to negate weight anchorage 16 suspends from guy system 18.

When anchorage 16 is raised to succeeding less pressure environments, the gas will expand in chamber 33 to depress the water level in housing 32 with float 133a lowering until double switch 134a is engaged by vanes 136a. Valves 124a and 126a are accordingly opened for the gas to escape to the lower pressure chambers above that are likewise being vented.

Wtih raising of cable buoys 44 likewise an accompanying gas volumetric increase lowers float 133b with displacement of water to activate switch 134b by resulting engagement of vane 136b to open main valve 126b. Simultaneously, float 133b makes contact with switch 151b which activates open individual valve 124b associated with that chamber in which the water level reached a lower limit. Thus chambers are individually controlled permitting slight differences in elevation of buoys comprising a cluster. Likewise raising of pontoon system housings 48, members 133, 134, 136, 118 and 124 and 151 are effective to vent chambers 28 of individual pontoons. Although not shown a circuitry like that of 147a for frame 138a is included for frame 138 but not for frame 138b (indicated as fixed in position).

An additional control of gas release for each chamber 28 is included only for the pontoon system 20. This comprises a double magnetic switch 153 and vanes 154 when in engagement again activates valve 118 and an individual valve 124. This engagement transpires when excess tension occurs in cable segments 39 as will become apparent subsequently. Remote and manually operated switch 155 shown in phantom is opened to make switch 153 ineffective.

With lowering of the system the volumetric content of gas chambers diminishes with increase in environmental pressure. Diminish of volume will also occur with leakage. Any such diminish is accompanied by raise of water level within the chambers and corresponding raise of floats 133, 133a, 133b; so that vanes 137, 137a, 137b engage respectively to activate switches 135, 135a, 135b to open valve 115 and operate motors 131a, 131b, 131c driving compressors 127a, 127b and 127c respectively. Simultaneously, floats 133, 133a, 133b makes contact respectively with switches 152, 152b, 135a which activates open individual valve 124, 124a, 124b associated with that chamber in which water level reached an upper limit.

To increase the gaseous volume of chamber 33 independent of other chambers to effect an increase of buoyant support of the anchorage 16, switch 144 is closed to activate motors 131a, 131b, 131c and open valves 115 and 126c. And switch 137a engaged to lower frame 138a to establish the increased volume.

To increase anchorage 16 bearing on floor 11, switch 141 is closed and switch 148a engaged to raise frame 138a thus venting gas from chamber 33. Switches 141 and 144 are alternately closed periodically to test controls of chambers activated for exchange of gas as required.

In view of the preceding coverage of the pneumatic and electrical circuitry it is assumed a comparable treatment is acceptable without presentation for valve mechanism 66 of FIG. 5 and 66a of FIG. 6.

It is to be observed that both switches 141 and 144 comprises three legs, one designated as orignating for the pontoon system 20, one relegated to the anchorage 16 and the third for the buoy system 44. Therefore, these switches 141 and 144 will have number of legs equal to two plus number of buoy clusters in the assembly.

Leveling device

Whenever a change of loading to structure 14 occurs to upset the plumb more than in designated limits, than leveling device 26 monitors such controls as to bring into effect members regulating buoyant support in opposition to the upsetting force. FIG. 1 shows approximate location of leveler 26. FIG. 4 is a partial and sectional view of the leveler with a float 92 confined in a toroidal housing 93 containing a supply of liquid 99 (such as oil) to establish float 92 midway between contacts 94, 95 and 96, 97.

FIG. 12 diagrammatically illustrates the leveler 26 associated with lead 146 as a switch device. It is to be observed a separate segment of a toroidal float is associated with a particular chamber 28. Float contact 98 in engagement with contacts 94, 95 indicate a list of structure 14 with pontoon 48 depressed below a level plane. Contacts 94 make circuitry to open indivdual valve 124 and contact 95 makes circuitry with valve 115 thus increasing volume of chamber 28 till that pontoon is realigned. Contrarily when contacts 98 are in engagement with contacts 96, 97 indicating excessive buoyancy with pontoon above level plane, then contact 97 makes circuitry with valve 124 and contact 96 makes circuitry with valve 118, thus venting volume of chamber 28 till the pontoon is realigned.

Guy wire system

Cable segment 39 of guy system 18 extends from equalizer 38 to pontoon system 20 where the segment as previously indicated may be a chain of segments with adjacent ends contiguous to a cable pontoon 44. The suspending cable is connected to a pontoon or buoy by a motorized reel 40 providing the store of cable for increased depth or capacity to haul in cable to retract the array. As illustrated in FIG. 5 the vertical assembly 40 depends upon a sheave 160 to train the cable on the reel and provides a constant centering of the cable with the pontoons for transmission of vertical forces. The assembly 40 in pontoon system 20 have brakes 91 set to release upon excess of a predetermined load whereas brakes 91b not shown have brakes locked for a constant extended cable between buoys and anchorage.

FIG. 11 shows an enlargement of the lower portion of reel assembly 40 with particular regard to mechanism associated with magnetic switch 153 previously mentioned with regard to gas release from chambers 28 to decrease cable stresses. Reel 158 mounted to and driven by shaft extension 159 protruding beyond bearing 161. A collar 162 loosely fits around extension 159 is opposed by compression spring 163 to move towards bearing 161. The end of shaft 159 has a protruding pin 164 fixed to it and prevents collar 162 from being forced off shaft 159 by spring 163. Pin 164 serves as a ratchet for the ratchet wheel effect provided in the end face of collar 162. Housing 165 an extension of bearing 161 provides a pocket 166 to receive a drag 167 effecting frictional resistance to the rotation of collar 162. Thus in one direction of shaft rotation the collar retains position in engagement with pin 164, but in reverse rotation the frictional resistance exerted by drag 167 is sufficient to retard collar rotation to enable the cam face 168 of the ratchet wheel to force collar 162 away from pin 164. A yoke 169 loosely fitted to groove 170 provided in collar 162 has mounted to it the dual vane 154 previously mentioned. Movement of collar 162 away from pin 164 induces vane 154 to activate switch 153. As arranged when reel rotates to unwind cable the switch is activated. Thus when the cable tension exceeds the holding power set in the brake it slips to unwind cable resulting in a release of gas from chambers 28 to diminish the buoyant support establishing the excess tension. This switch 153 would activate valve 78 previously left for discussion.

When the motorized reel 40 is deliberately activated to unwind cable for lowering the assembled array, then switch 155 is opened to break the circuit to inactivate switch 153 thus retaining the buoyant support of chamber 28 during lowering. Similar treatment with the use of which 155 is employed with adjusting of cable lengths as is subsequently developed.

Equalizer

Since as illustrated in FIG. 2 there are three pontoons to be restrained below surface 12, the segment 39 comprises three wires 171, 172, 173, extended between anchorage 16 and pontoon system 20. Insofar as the treatment of the equalizer is concerned it is immaterial whether buoys 44 are present or not. The lower end of these lines are secured to the tubular extension 174 of coupling 34 (see FIG. 6) through means of a tension equalizer 38 corresponding to Reference B. This device comprises two beams 176 and 178 pivoted to the tubular support 174 and a third beam 180 extends from the distal ends of the first two beams by intermediate cables 181 and 182. The guy lines 171 and 172 are secured, respectively, to the close ends of the beams 176 and 178, and the guy line 173 is secured to the center of the beam 180. The pivot axes of the beams 176 and 178 are spaced from the distal and close ends thereof in a two-to-one ratio. Through the geometric interrelationship of the beams and the pivot and cable connections thereof, tension in the guide lines 171, 172 and 173 is equalized. Each of the upper ends of guy lines 171, 172, 173 are spooled onto reels 158 of assembly 40 in pontoon system 20. An electric control similar to 147a (though not shown) is employed for the rotational direction of motorized reel 40. A leveling device 183 is mounted to beams 176, 178 of the mercoid switch type that completes a circuit through a liquid mercury body 184 in series of one leg in an electric system. FIG. 10 illustrates such a switch 183 with terminal 146 permanently in contact with mercury an extension off the common lead in switch 188 of type like 147a. Tilt of beams 176, 178 will eventually cause the mercury to contact one or other exposed electrodes 185–186 also connected to leads of switch 188 so as to correctly rotate motorized reel 40 for cable length adjustment to level the equalizer beams. Flexible tubing 187 encasing electric leads to chamber 33 also transmits gaseous pressure to switch 183 thereby equalizing internal pressure in the switch with that of the environment to which it is subjected.

Stabilizer

In order to maintain vertical alignment and orientation between the structure 14 and the anchorage 16 an alignment mechanism 42 is mounted on the underside of the structure 14 for cooperation with the guy lines 171, 172 and 173. The control portion of this mechanism comprises: three rods 191 fixed to and depending downwardly from pontoon 48 at equal angularly spaced positions straddling the guy lines, a fourth rod 192 fixed to and depending downwardly likewise at a location between a pair of the rods 191; a plurality of eye bolts 193, one of which is pivotally supported on each of the rods 191 and extends inwardly therefrom; a magnetic vane 194 on each of the bolts 193; an arm 195 fixed to and extending inwardly from the bolt 192; a magnetic vane 196 at the inner distal end of the arm 195; a ring 197 suspended from the guy lines 171a, 172 and 173 and having first slot 198 therein slidably receiving the bolts 193 and a second slot 199 therein slidably receiving the arm 195; a plurality of first magnetic vane switches 200, one of which is mounted on the ring 197 adjacent each of the slots 198 for activation by the vane on the bolt extending therethrough; a second vane switch 201 mounted on the ring 197 adjacent the slot 199 for activation by the vane 196 of the arm 195 a first electrical lead 146 extending from a source of current and connected to one side of each of the switches 200 and 201; a second electrical lead 145 and, an electric motor 202 connected across the leads 146 and 145.

The motion imparting portion 30 of the alignment mechanism 42 comprises: a water manifold 205 (see FIGS. 1 and 7) of annular configuration fixedly supported on the structure 14 in concentric alignment therewith; a centrifugal pump 203 interposed in the manifold 205 to effect the pressurization thereof, said pump being driven by motor 202 a plurality of radially extending nozzles 206, one of which is secured in fluid communication with the manifold 205 in radial alignment with each of the bolts 193; an electrically operated valve 207 for each of the nozzles 206 to normally maintain it in a closed condition and, upon energization, effect its opening; a pair of electrical leads 145 and 146 connecting each of the valves 207 across the switch associated with the bolt 193 radially aligned with the nozzle thereof and the lead 145; an annularly extending nozzle 204 secured in fluid communication with the manifold 205; an electrically operated valve 208 interposed in the nozzle 204 to normally maintain it in a closed condition; and, a pair of electrical leads connecting the valve 208 across the switch 201 and the lead 145.

Through the foregoing arrangement, when the structure 14 traverses laterally relative to the anchorage 16, the radially extending nozzles 206 are selectively activated to return these stations to a vertically aligned condition. For example, when the station 14 moves to the right, as illustrated in FIG. 1, and from the phantom circle representation in FIG. 7, the nozzle 206 at the right of the manifold 205 is opened to permit water to be jetted therefrom and thus react to propel the structure 14 back to the left. It should be appreciated that more than one of the nozzles might be simultaneously activated, depending upon the direction in which the structure 14 moves out of vertical alignment with the anchorage 16. It is movement of the ring 197 relative to the structure 14 and responsive closing of the main switches 200 which effects selective operation of the nozzles. The phantom line representation in FIG. 1 clearly shows this movement. It results because the ring 197 is supported on the guy lines 171, 172 and 173.

It is here noted that vertical misalignment of the structure 14 relative to the anchorage 16 may result from any number of causes. For example, ocean currents or movement of objects against structure 14 may impart lateral misaligning forces. Rotational misalignment, however, is likely to occur primarily in one direction, assumed clockwise. For this rotational direction, the nozzle 204 is positioned to react only in a direction moving the station 14 in a counterclockwise direction. Its operation is controlled by the switch 201. This switch is activated whenever the structure 14 moves in a clockwise direction relative to the ring 197 sufficient to close the main switch 201.

If there is need to provide reaction force to turn the structure 14 in either direction of rotation for alignment purposes, a pair of nozzles 204 facing in opposite directions may be provided. In this case, it is simply necessary to position a vane switch 201 to either side of the vane 196 on the arm 195 and to wire the oppositely directed nozzles to the respective switches. Thus, the vane 196 would function, alternatively, to open either of the nozzles to effect rotational movement of the structure 14 in either a clockwise or counterclockwise direction to re-establish rotational alignment.

While the pump 203 has been described as being continuously driven by the motor 202 it should be understood that the motor may be wired so as to be activated only upon closing of one of the switches 200 or 201. It should also be understood that the pump 203 would normally be supplied with water directly from the body of water within which the structure 14 is submerged. Also motion of wires 171, 172, 173 relative anchorage 16 may be translated to activate switches 200, 201 by other means, such as utilizing pontoons 48 to mount the switches and discard ring 197. Rods 191 would then terminate with a hinge serving as the fulcrum for vertical levers; lower end arranged to fit loosely around a wire 171, 172, 173, and the upper end arranged to accommodate bolts 193 with vanes 194 aligned with switch 200. Mechanical advantage attainable from relative distances of lever ends to the fulcrum would factor increase any movement of wires 171, 172, 173 relative rods 191.

Cable failure

In the event a cable breaks to upset the equalizer system of uniform restrain to pontoon system 20, an arrangement is included for that emergency to establish the vertical array quickly into the position assumed as a floating apparatus prepared for movement to another site.

The motorized reels 40 are solidly mounted to cable buoys 44 but are pivotly mounted to pontoons 48 by a hinge connection 80 located intermediate the center of gravity of reels 40 and an extension of the centerline of sheave 160. The cable reaction to sheave 160 produces a turning movement about hinge 80 in opposition to the sum of moments about hinge 80 of the reel 40 weight and resistance offered of valve seat 81 to valve disc 82 being impressed by bracket 83. Valve disc 82 is universally connected to the bracket arm 83 supporting reel 40. In effect therefore valve disc 82 is held closed because of cable tension. When the cable is broken or tension released the reel assembly 40 falls away with valve disc to vent chamber 28 with rise of water level within pontoon 48.

Valve seat 81 is integral with conduit 84 and valve 85. Valve 85 is normally spring loaded open and electrically operable closed by a magnetic switch 86 activated by a vane 87 mounted to a float structure 88. Float 88 is positioned to activate switch 86 when the raised water level supporting the float defines a volume of gas providing buoyant capacity as a supplement to the displacement of vessel 24 when at water level 12b for their combined support of structure 14.

A magnetic switch 89 supported by pontoon 48 is activated by a vane 90 connected to bracket 83. Brakes 91 for reels 40 are conventional magnetic type, released at all times current flows to the motor and automatically set when power is shut off. Spring force is adjusted to a predetermined maximum cable tension.

Each magnetic brake 91 of the reels 40 is connected to the switches 89, so that when any one cable breaks the other brakes are released in effect opening all conduits 84 to vent all chambers 28 of the pontoon system 20. With the escape of gas the water level rises in pontoon 48 to cause float 88 to activate switch 86 thus close valves 85 and activate switch 147 to raise 129 for minimum buoyancy. With the diminish in voume of chambers 28 the pontoon system settles for deeper immersion until vessel 24 floats to add its displacement capacity to the stable support of structure 14.

With vessel 24 at liquid level 12b, the vertical array may be retracted, noting that monitoring and control of the various objects permits negating their weights so that remaining sound wires serve merely to guy rather than lift.

CONCLUSION

From the foregoing description it is believed apparent that the present invention enables the accomplishment of the object initially set forth herein. It is understood, however, that the invention is not intended to be limited to the specific details of the exemplary embodiment herein described. For example, it is considered well within the province of the invention that the guy cable system associated with reel take-up be for a short segment of the length and thereafter for the remaining segments of the length rely on segments without take-up provision. Likewise with reference FIG. 9 as partially indicated in phantom, to produce a six strand equalizer system is contemplated as optional either by stacking dual systems or simply by double extending arms 176, 178 in equal lengths in accommodation with a second bar parallel to 180 for a duplication of wire 173 having applied the counterpart of 171, 172 to leg 176–178. No attempt will here be made to enumerate all possible variations or include various incidental elements such as service lines covered in mentioned references.

What is claimed is:

1. In an elongated array of objects disposed substantially vertically in a body of liquid to a finite position by a vertically extended wire system tension connected between primary buoyant chambers and a single anchor bearing on the floor of the liquid, an improved system comprising:
    (a) primary buoyant chambers relegated to a completely immersed situation have gaseous volumes confined in part by contact with the liquid and are pressurized corresponding to that of the liquid at the situation;
    (b) said chambers have support capacity selectively adjusted in excess of the supported weights with the support attributed to weight of liquid displacement by said volume;
    (c) monitoring and control means to vary and distribute the buoyant support commensurate with changes in load and placement on the array;
    (d) said support capacity is sustained in transition of the array through different environmental conditions by accommodations to retain the gaseous volume of the chambers with changes of the liquid pressure;
    (e) said wire system includes an equalizer to automatically establish equal tension mutually among cables extended from the anchor to individual primary chambers, and having:
        (1) adjustable means to establish and maintain said excess as tension load transmitted by the cables to immerse the chambers;
        (2) monitoring and adjustment means to establish and maintain spaced relationship of the objects of the array;
    (f) said anchor adapted to retain position with respect the floor having:
        (1) a universal coupling contrived with the wire system to immerse the primary chambers automatically to selected elevated relationship;
        (2) a buoyant chamber with monitoring and control means to vary said bearing to the floor, to negate the weight of the anchor when in suspended position off said floor and sustain selected volumetric content of the chamber responsive to effects associated with pressure change in transition through various degree of immersion; and,
        (3) the said anchor monitor has at least one liquid level sensing means in response to the position assumed of said anchor with the contour of said floor.

2. In a wire system according to claim 1, said cable length comprises a number of equal segments of the cable length interconnected by a buoy to support the weight of the depending segment with buoy monitoring and control means to sustain the established buoy support during said transition.

3. An elongated array according to claim 1, having a rigid structural portion of negative buoyant capacity to support an elevated platform above said buoyant chambers, said structural portion having a broad base to connect the chambers in dimensional relationship to each other exceeding the height of the elevated platform above by at least a 2 to 1 ratio.

4. In an improved support system according to claim 3, said platform is defined as the deck of a water-tight vessel with support capacity to supplement diminished support capacity of said primary chambers when said vessel is disposed below said surface as an immersed array of objects, having:
    (a) retracting means associated with said wire system to effect said control of buoyant and chambers to a depth providing immersion of said vessel; and,
    (b) means in communication with above surface atmosphere to sustain operability and manipulation of said array.

5. An improved support system according to claim 3, said platform is defined as the deck of a water-tight vessel with capacity when said vessel is disposed at said surface to provide supplementary support of the array of objects.

6. In an array according to claim 1 further comprising:
    (a) alignment monitoring means to sense vertical misalignment of said objects relative said anchor;
    (b) alignment propulsion means secured to one of said objects, said propulsion means being selectively operable to effect the guided traversal of said array supported in the body of water; and,
    (c) alignment control means coupling the alignment monitoring means to the propulsion means to control operation of the propulsion means responsive thereto so as to maintain the array in substantially vertical alignment with the anchor.

7. In an array according to claim 6 further comprising:
    (a) rotation monitoring means to sense rotational movement of the array relative to the anchor;

(b) rotational propulsion means secured to one of said objects, said propulsion means being selectively operable to effect rotational movement of the array relative the anchor; and, (c) control means coupling the rotation monitoring means to the rotational propulsion means to control operation of the propulsion means responsive thereto so as to substantially maintain the array against rotational movement relative to the anchor.

8. In a system for the support of a station by a pontoon means restrained to an immersed position in a body of water by a tensioned guy system anchored to the floor of said water, the improvement comprising:

(a) said pontoon system is compartmentized into individual chambers, each monitored and controlled by regulating means to establish distributed support corresponding to the placement of imposed loads when applied;

(b) said guy system includes multiple strands of cable with at least one strand connected to each said chamber by a means to equalize tension and provide uniformity in extension of said strands cooperating with adjustable means to vary the depth of said immersed position;

(c) said immersed position is established by buoyancy support in excess of the supported load, said excess limited by tension release means coupling said adjustment means with said regulating means to provide:

(1) a support system dependent upon adjustment of buoyant capacity with load change; and, (2) a guy system dependent structurally upon the said limit to establish taut cables; and, (d) a stabilizing system to retain a vertical alignment and orientation of said station with said anchor having:

(1) monitoring and control means activated by angular displacement of said taut cables; and, (2) propulsion means oriented to re-establish said vertical alignment responsive to said monitoring and control means.

9. In an installation disposed below a gas supply source capable of providing gas at pressure sufficient for introduction thereof to the first station of a series of stations disposed respectively at succeedingly greater depths in a body of liquid, said stations each having:

(1) a plurality of housings each confining a volume of gas in a chamber defined by a regulated liquid level in communication with and at a pressure corresponding to the depth of immersion in said liquid;

(2) adjustable positioned liquid level control means establishing a specific volumetric content for each said chambers; and, (3) control means retaining volumetric content of each said chambers responsive to effects associated with pressure change in transition of stations through various degree of immersion;

an improved system for charging and discharging gas from said chambers comprising:

(a) a primary conduit as the sole means of fluid communication for chambers between stations;

(b) a manifold connected in said primary conduit from which secondary conduits provide fluid communication to each chamber at the station;

(c) a primary valve interposed in said primary conduit below said manifold;

(d) a secondary valve interposed in said secondary conduit;

(e) a fluid pump interposed in said primary conduit with inlet connected above said primary valve and discharge connected below said primary valve to increase the pressure in the primary conduit below said primary valve, effecting a bypass of said primary valve with a check valve in said bypass; and, (f) said primary valves and pump remotely operable electrically by float actuated switches associated with individual chambers situated in the station adjacently below.

10. In an elongated array of objects disposed substantially vertically in a body of water to a finite position having a buoyant structure, an anchorage and a tensioned wire system secured between the anchorage bearing on the floor of the body and a cluster of air chambers defining an immersed lower portion of the structure, the improvement comprising:

(a) a watertight immersible vessel, normally disposed above water defining an upper portion of the structure, is secured by a rigid skeleton superstructure to the lower portion;

(b) the cluster of chambers are selectively and individually monitored and controlled to vary their capacity to buoyantly support the array;

(c) the vessel of constant volume provides supplementary buoyant support to and with descent of the array corresponding to the vessel displacement of the body of water;

(d) the wire system is selectively adjustable in length to restrain the structure to a remote position above the anchorage, opposing buoyant capacity of the chambers in excess of the array weight;

(e) the wire system is instantly tension released upon failure of one cable of the system connected to a chamber; and, (f) means automatically vent a portion of the air volume contained in the chambers upon failure of any cable of the wire system to free the structure of excess buoyant capacity.

11. In an elongated array of objects interconnected in tension transmitting relationship and disposed substantially vertically in a body of liquid, an improved support system comprising:

(a) a pontoon system defining individual chambers establishing buoyant support capacity in excess of the weight of said array and said pontoons restrained to a totally immersed position in said liquid, having:

(1) monitoring and control means for each individual chamber establishing support capacity in conformance with variance and distribution of imposed loads;

(2) a leveling device cooperating with said monitoring and control means to retain the plumb of said pontoon system;

(b) a plurality of cables connected to an anchor disposed on the floor of said liquid by an equalizer means with at least one said cable in control of each individual chamber, having:

(1) length adjusting means defining said control of equally tensioned cables cooperating with said leveling device;

(2) a tension limit means associated with said monitoring and control means to define the maximum said excess capacity transmitted by said cables;

(c) said length adjusting means is pivotally connected to the individual chambers and retained in fixed position by the reaction of tensioned cables and gravitationally falls away from fixed position upon release of tension in said cables;

(d) said adjustment means are interconnected to release tension of all other cables upon tension release of any one cable;

(e) an auxiliary valve normally closed by the fixed position of said cable length adjustable means and opened by said gravitational pull to provide a vent of gas from said individual chambers upon release of tension in said cables;

(f) said vent having an electrically operable valve to close by an auxiliary float actuated switch limiting said chambers to a minimum support capacity; and, (g) said auxiliary float actuated switch cooperates with and establishes said monitoring and control means to provide a corresponding support capacity of the buoyant chambers.

12. In an elongated array of objects interconnected in tension transmitting relationship and disposed substantially vertically in a body of liquid, an improved wire system comprising:
(a) a plurality of wires connected to an equalizer system that establishes uniform tension between wires;
(b) an adjustment means associated with said equalizer to retain uniformity in extension of the wires by compensating for construction and elastic stretch;
(c) said adjustment means adaptable to vary the extension of and establish a maximum selected tension in said wires;
(d) said wires are segmentally supported to diminish the concentration of load attributed to weight of the wire to correspondingly increase the load transfer capability of the wires;
(e) said adjustment means for each wire arranged to simultaneously release tension in the plurality of wires upon failure of any one wire;
(f) a stabilizing system to retain a vertical alignment and orientation of the array, having:
(1) monitoring and control means activated by angular displacement of said tensioned wires; and,
(2) propulsion means oriented to re-establish said vertical alignment responsive to said monitoring and control means.

References Cited

UNITED STATES PATENTS

| | | | |
|---|---|---|---|
| 2,908,141 | 10/1959 | Marsh, Jr. | 61—46.5X |
| 2,972,973 | 2/1961 | Thearle | 61—46.5X |
| 3,031,997 | 5/1962 | Nesbitt | 61—46.5X |
| 3,154,039 | 10/1964 | Knapp | 61—46.5X |
| 3,359,741 | 12/1967 | Nelson | 61—46 |
| 3,389,671 | 6/1968 | Yost | 114—.5 |

JACOB SHAPIRO, Primary Examiner

U.S. Cl. X.R.

61—69; 114—.5, 206